United States Patent [19]

Brown et al.

[11] Patent Number: 4,745,684
[45] Date of Patent: May 24, 1988

[54] SOLDER THICKNESS MEASUREMENT METHOD AND APPARATUS

[75] Inventors: Kerry L. Brown, Sunland; Robert A. Harger, Manhattan Beach, both of Calif.

[73] Assignee: Hughes Aircraft Company, Los Angeles, Calif.

[21] Appl. No.: 944,051

[22] Filed: Dec. 17, 1986

[51] Int. Cl.$^4$ .................................................. G01B 5/00
[52] U.S. Cl. .................................. 33/169 F; 33/172 E
[58] Field of Search ............ 33/169 R, 172 E, 169 B, 33/169F

[56] References Cited

FOREIGN PATENT DOCUMENTS 1209014  10/1970  United Kingdom ............. 33/169 F Primary Examiner—Harry N. Haroian
Attorney, Agent, or Firm—Leonard A. Alkov; A. W. Karambelas

[57] ABSTRACT

A carrier (36) brings a probe (42) down to the solder surface (28) and a base measurement is taken. The solder is heated to melt the solder and the probe moves down through the liquid solder to the next solid therebelow, and a second position measurement is taken. The base measurement is subtracted therefrom to yield the solder thickness.

16 Claims, 3 Drawing Sheets

SOLDER THICKNESS MEASUREMENT METHOD AND APPARATUS

BACKGROUND OF THE INVENTION

This invention is directed to an apparatus by which solder thickness is measured by use of a probe to take a base measurement on the solder surface, liquefying the solder, and taking a second position measurement, the difference of which is the solder thickness, thus providing a non-destructive measurement system.

Solder is put on the copper traces and pads on printed wiring boards to facilitate the attachment of electrical devices, such as leadless chip carriers, flatpacks, and axial leaded components. Electroplating is the preferred process to place solder on the traces and pads. The control of solder plating thickness has always been accomplished by calculating the process parameters to achieve the desired solder plating thickness. The plating takes place along those process parameters, and the desired solder plating thickness is presumably achieved. In order to check the thickness, an adjacent test coupon is plated at the same time and presumably with the same conditions as the circuit traces. However, there is often an error in the solder plating thickness on the coupon as compared to the circuit traces due to variations of current flux density over the printed wiring board. The thickness of the solder plated on the coupon is measured by microsectional analysis. Such analysis takes time, and feedback information is not always readily available to correct plating errors.

X-ray fluorescence is a non-destructive method for measuring solder thickness. One disadvantage of X-ray fluorescence as a measuring method is that it can only be employed to measure solder thickness less than 0.002 inch. While such solder thickness is suitable for many applications, the use of a thicker solder layer is desirable for mounting a leadless chip carrier. When a leadless chip carrier of moderate size is supported by a relatively high column of solder, the solder will not suffer from cracking when subjected to mechanical stress caused by the mismatch in the thermal expansion coefficients between the printed wiring board and the ceramic leadless chip carrier. A tall column of soft solder can flex to absorb the stress. In such applications, a measuring procedure which is capable of measuring thickness in excess of 0.002 inch is required.

Beta particle backscatter is another solder thickness measurement system used in the circuit board industry. In this procedure, a high energy beta ray emitter such as strontium-90 is employed. This procedure is capable of measuring solder thickness up to 0.005 inch. However, this solder thickness measuring procedure gives varying results with changes in composition of the plated solder alloy. Similarly, the indicated thickness measurement changes with the presence of copper layers within the printed wiring board. Due to measurement uncertainties, this method is not commonly used.

Accordingly, a solder thickness measuring system and apparatus is required which is non-destructive of the solder plate and printed wiring board, and which allows for timely and economical solder thickness measurement with an accuracy better than the present-day systems. In addition, there is need for such a system and apparatus wherein the solder thickness does not limit the measuring accuracy. Further, such a solder thickness measurement system and apparatus should not be affected by variations in solder alloy or variations in printed wiring board substrate composition.

SUMMARY OF THE INVENTION

In order to aid in the understanding of this invention, it can be stated in essentially summary form that it is directed to a solder thickness measurement method and apparatus wherein a device is relatively translated toward a printed wiring board. This device has a probe thereon which is connected so that it takes a base measurement of the height of cold solder on the printed wiring board. Thereupon, the solder is heated and the probe plunges to a second position on the copper trace at the bottom of the liquid solder layer. The measured displacement between the base measurement and the second position measurement is the solder thickness.

It is thus a purpose and advantage of this invention to provide a solder thickness measurement system which is non-destructive and which accurately and quickly measures the solder layer thickness without limits on the solder thickness or without being affected by solder alloy or printed wiring board substrate composition.

It is another purpose and advantage of this invention to provide a solder thickness measurement system which acts quickly so that, placed in a production line, solder thickness may be immediately measured. If required, corrections may be made to the solder plating process.

It is another purpose and advantage of this invention to provide a solder thickness test system which is economical to install and is easily operated to supply accurate solder layer thicknesses so that the test system can be widely employed.

Other purposes and advantages of this invention will become apparent from a study of the following portion of this specification, the claims and the attached drawings.

DESCRIPTION OF THE PREFERRED EMBODIMENT

Figure 1:
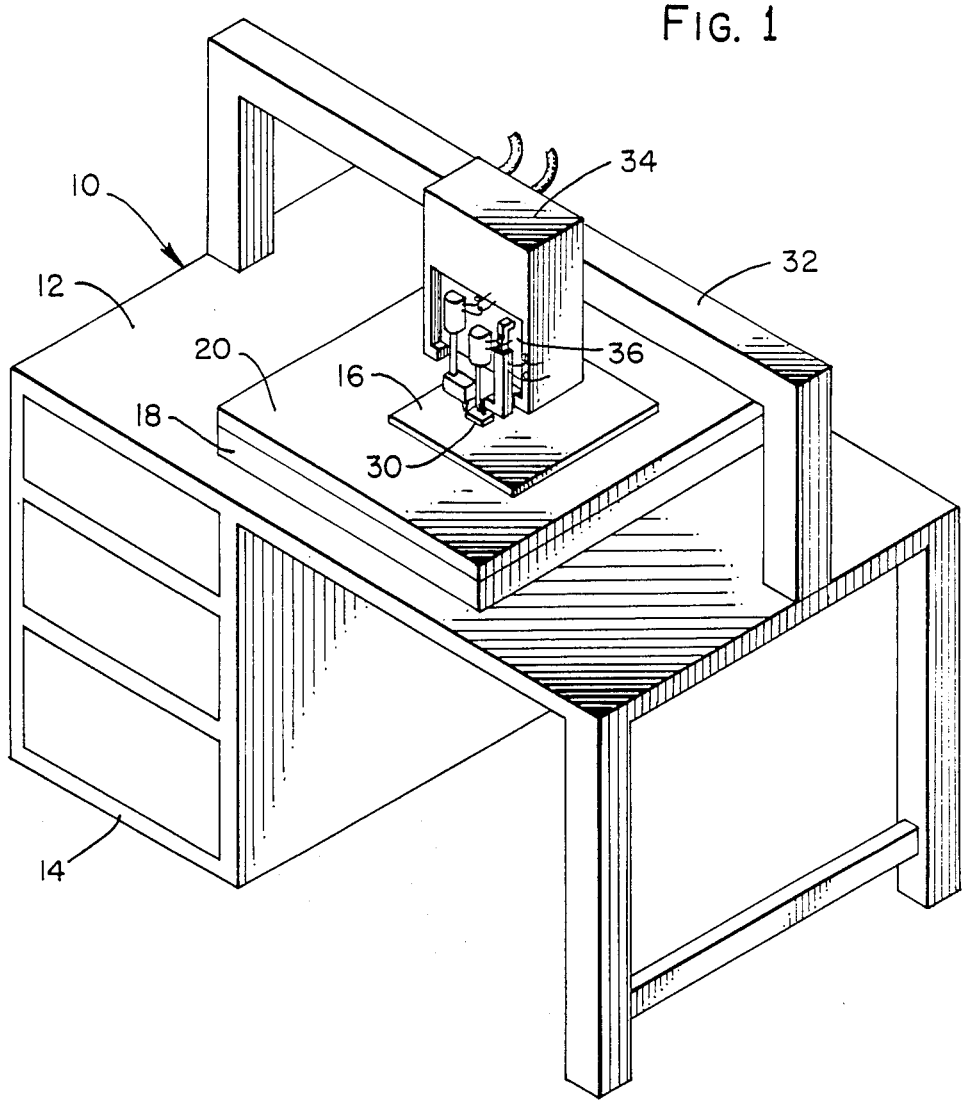
FIG. 1 is an isometric view of the a solder thickness measurement apparatus which employs the system of this invention.
Figure 3:
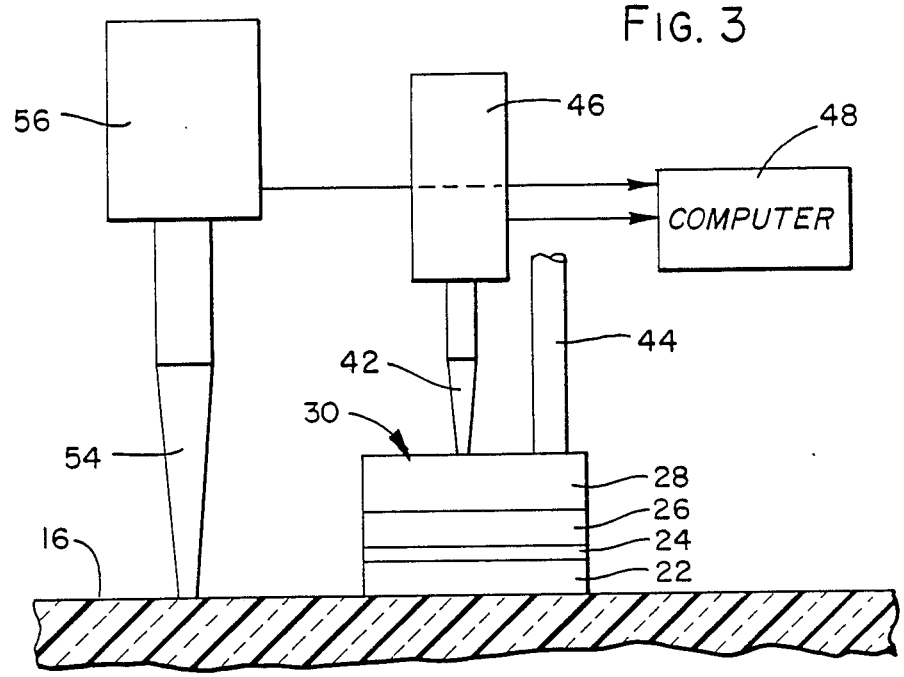
FIG. 3 is a further enlarged front-elevational view, with parts broken away showing the measurement apparatus in a position to take a base measurement.
Figure 4:
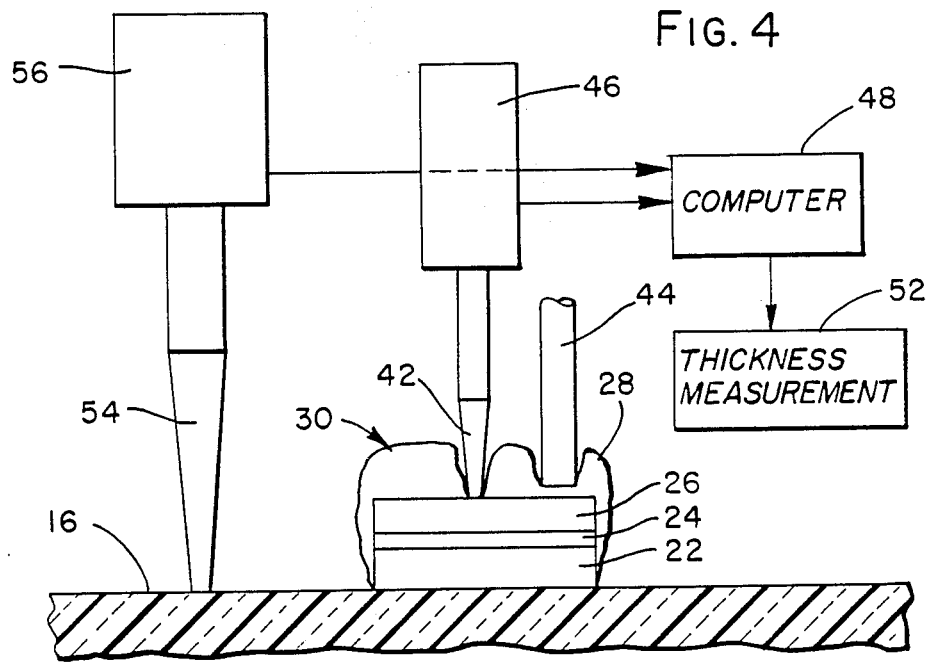
FIG. 4 is similar to FIG. 3, but shows the probe in the second measurement position.

As seen in FIG. 1, table 10 supports all of the equipment of the solder thickness measurement apparatus of this invention. The electronics of the apparatus can be housed in base 14 which serves as support for the table top in addition to the legs illustrated. Printed wiring board 16 may be positioned, as required by translation of X-Y table 20, supported by X-Y base 18, mounted on table top 12. Preferably, positioning is automatically accomplished by means of a computer program. As is seen in FIGS. 3 and 4, the printing wiring board 16 has one or more circuit traces 22 thereon, formed of copper traces secured to the top of the dielectric portion of the printed wiring board 16. The circuit trace 22 may be built up in various ways, and in the present case, is built of multiple layers, facilitating through hole vias. For example, an electroless copper layer 24 is plated on the copper circuit trace 22, and an electrolytic copper layer 26 is plated thereon at least over a part of the area. The copper layer 26 may represent a connection pad. Solder layer 28 is plated over or otherwise deposited on top of the copper layer 26, at least over the pad area. For the purpose of identification, the portion of the circuit trace shown in FIGS. 3 and 4, including the solder layer 28 on the top, is generally indicated as pad 30 so as to aid in its identification in FIGS. 1 and 2. The pad is part of a circuit trace network on the printed wiring board 16 which serves an electrical purpose. It is the thickness of the solder layer 28 on the pad 30 which is of interest and needs to be measured.

Figure 2:
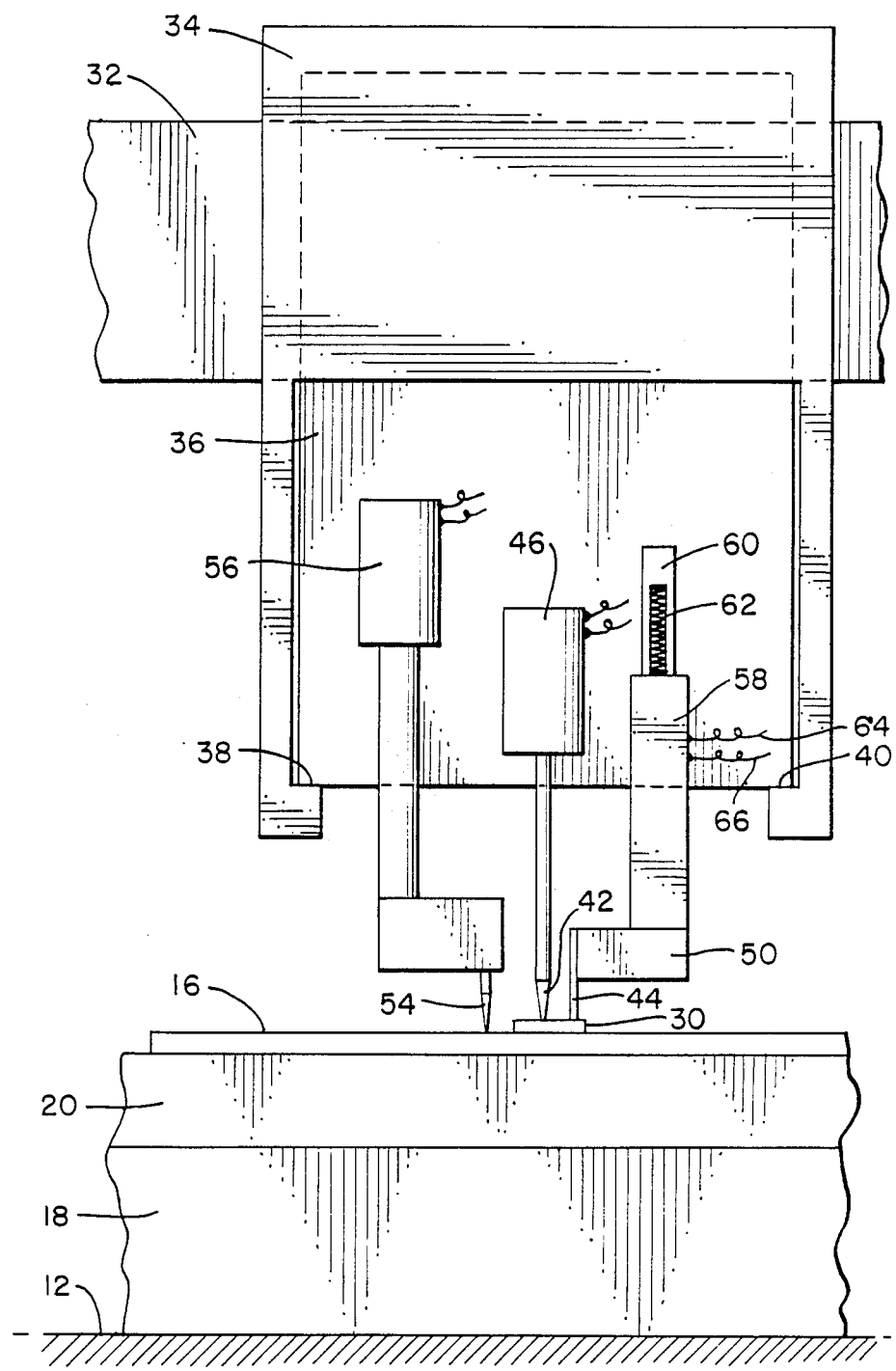
FIG. 2 is an enlarged front-elevational view thereof, with parts broken away.

Referring to FIGS. 1 and 2, bridge 32 is secured over table 12 in a rigid, fixed position so that it serves as a support for equipment for measuring with respect to a table top and the top of X-Y table 20. Frame 34 has translator 36 slidable therein in the up and down direction at right angles to the direction of movement of the X-Y table 20. Thus, translator 36 moves in the Z-direction. The Z-direction of movement of translator 36 is provided so that, in the raised position of the translator, there is space to remove and replace the printed wiring board 16. In the lowered position of translator 36, it abuts fixed stops 38 and 40 in order to positively locate the lowered position of translator 36. It is in the lowered position when the translator is against the stops that the entire structure is mechanically rigid so that accurate measurements can take place.

Probe 42 is slidably mounted in transducer 46. As is seen in FIG. 2, the body of transducer 46 is mounted on translator 36. The transducer is a linear transducer which measures the position of probe 42 therein. The linear transducer can be of any convenient type, such as a linear variable differential transformer, an optical ruled slide, or a laser interferometer. When the translator is brought down, the probe 42 contacts the top of solder 28 on pad 30, as shown in FIG. 3. The probe may be of any material which is non-wetting, has low thermal conductivity, and has low thermal coefficient of expansion. Inconel is suitable.

A heater is provided for melting the solder layer 28 on the top of the pad for the purpose of thrusting probe 42 therethrough to measure the thickness of the solder layer. The heater may be of any convenient type, such as laser or infrared radiation. The heat may be added by a directed stream of hot air. Conduction is also a practical way of delivering adequate heat to the solder 28 on the pad. Heater pin 44 is a flat-end molybdenum pin adjacent to probe 42, which is secured to the heated loop of hairpin heater 50. The hairpin heater 50 is carried on body 58, which can translate downward on guide 60. Spring 62, if necessary, applies downward force on the heater pin to ensure contact with pad 30. Lines 64 and 66 supply power to the hairpin heater 50 which, in turn, supplies heat to heater pin 44.

After the first, reference measurement is taken, the heater pin is heated to a sufficient degree to melt the solder 28 on the pad. The resilient downward spring force of probe 42 out of the transducer body causes the probe to move down through the melted solder until the probe moves downward substantially against the top of layer 26, as is shown in FIG. 4. In this position, the power may be discontinued from the heater and the probe and pad allowed to cool to eliminate thermal expansion effects if such are found to be significant. This second position is read by the transducer 46 and the measurement is transferred into computer 48. The first or base measurement is subtracted from the second position measurement, and the difference is the solder thickness which is displayed and recorded.

When the second position measurement is complete the probe 42 is withdrawn. Due to the small size of probe 42, the shape of solder layer 28 on pad 30 remains essentially unchanged for purposes of further processing of Printed Wiring Board 16. Therefore, the test is in effect a non-destructive test.

Reference sensor probe 54 is positioned adjacent probe 42. It is mounted upon linear transducer 56, as is shown in FIG. 2. Transducer 56 can be the same type as transducer 48, and its spring urges the reference senser probe 54 in the downward direction. Transducer 56 is connected to computer 48 so that its measurement signal is conveyed to the computer. The purpose of the transducer 56 is to measure changes in the position of the surface of printed wiring board 16 between the first or base measurement and the second position measurement of probe 42. Any change in position of reference sensor probe 54 between those two measurements is appropriately added or subtracted from the thickness measurement. Thus, the transducer 56 and its reference sensor probe 54 serve to overcome any measurement error which would arise from Z-direction movement of the printed wiring board 16 during measurement.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A solder thickness measurement apparatus comprising:

mounting means for carrying thereon an article having a solder layer thereon the thickness of which is to be measured;

a height measurement probe for bringing into contact with the top of the solder layer when it is cold;

means for measuring the first position of said probe when it is in contact with the top of the cold solder layer;

means for recording the height of the top of the cold solder layer;

heating means for heating the solder sufficiently to melt the solder layer so that said probe moves substantially to a second position at the bottom of the solder layer;

means for measuring the second position of said probe substantially at the bottom of the solder layer;

means for substracting the positions of said probe one from the other in order to determine substantially the thickness of the solder layer; and a reference sensor probe positioned so that said reference sensor probe can contact the uncoated top surface of the article adjacent the solder on the article, said reference sensor probe being connected to correct the indicated thickness of solder as a consequence of movement of the article between the first and second measurements made by said heat measurement probe.

2. The apparatus of claim 1 wherein said means for supporting comprises a table and said probe is mounted with respect to said table.

3. The apparatus of claim 2 wherein said table includes an X-Y table for laterally positioning the solder layer with respect to said probe.

4. The apparatus of claim 2 wherein said probe is supported on a bridge extending over said table.

5. A solder thickness measurement apparatus comprising:
mounting means comprising a table for carrying thereon an article having a solder layer thereon the thickness of which is to be measured, a bridge extending over said table, a translator movably mounted on said bridge to move in a direction toward and away from said table and positive stops to limit motion of said translator in a direction toward said table;
a height measurement probe mounted on said translator for bringing into contact with the top of the solder layer when it is cold;
means for measuring the first position of said probe when it is in contact with the top of the cold solder layer;
means for recording the height of the top of the cold solder layer; and
heating means for heating the solder sufficiently to melt the solder layer so that said probe moves substantially to a second position at the bottom of the solder layer;
means for measuring the second position of said probe substantially at the bottom of the solder layer;
means for subtracting the positions of said probe one from the other in order to determine substantially the thickness of the solder layer; and
a reference sensor probe positioned so that said reference sensor probe can contact the uncoated top surface of the article adjacent the solder on the article, said reference sensor probe being connected to correct the indicated thickness of solder as a consequence of movement of the article between the first and second measurements made by said heat measurement probe.

6. The apparatus of claim 5 wherein said means for measuring is a linear transducer having a body mounted on said translator and having a movable member which carries said probe.

7. The apparatus of claim 6 wherein said transducer is connected to a computer memory so that the first position of said probe causes a first signal out of said transducer to said memory and said second position of said probe produces a second signal out of said transducer to said memory.

8. The apparatus of claim 7 wherein said table includes an X-Y table for laterally positioning the solder layer with respect to said probe.

9. The apparatus of claim 7 further including a reference sensor probe positioned so that said reference sensor probe can contact the uncoated top surface of a printed wiring board adjacent a pad on the printed wiring board, said probe being connected to correct the indicated thickness of solder as a consequence of movement of the printed wiring board between the first and second measurements made by said probe.

10. A solder thickness measurement apparatus comprising:
mounting means for carrying thereon a printed wiring board having a solder pad thereon the thickness of which is to be measured;
a height measurement probe for bringing into contact with the top of the solder pad when it is cold;
means for measuring the first position of said measurement probe when it is in contact with the top of the cold solder pad;
means for recording the height of the top of the cold solder pad;
heating means for heating the solder pad sufficiently so that said height measurement probe moves substantially to a second position at the bottom of the solder pad;
means for measuring the second position of said height measurement probe substantially at the bottom of the solder pad;
means for subtracting the positions of said height measurement probe one from the other in order to determine substantially the thickness of the solder pad; and
a reference sensor probe positioned so that said reference sensor probe can contact the uncoated top surface of the printed wiring board adjacent the solder pad on the printed wiring board, said reference sensor probe being connected to correct the indicated thickness of solder as a consequence of movement of the printed wiring board between the first and second measurements made by said height measurement probe.

11. The apparatus of claim 5 further including a reference sensor probe mounted on said translator and positioned so that said reference sensor probe can contact the uncoated top surface of a printed wiring board adjacent a pad on the printed wiring board, said probe being connected to correct the indicated thickness of solder as a consequence of movement of the printed wiring board between the first and second measurements made by said probe.

12. The apparatus of claim 1 wherein said heating means comprises a conductively heated heater pin which is positioned to be in contact with the solder layer for the heating of the solder layer to melt the solder layer so that said probe can move to its second measured position.

13. The apparatus of claim 5 wherein said heating means comprises an electric heater mounted on said translator and a heater pin thermally connected to said electric heater so that said heater pin is moved into contact with the solder layer to melt the solder layer on the pad so that said probe can move to its second position.

14. The apparatus of claim 9 wherein said heating means comprises a conductively heated heater pin which is positioned to be in contact with the solder layer for the heating of the solder layer to melt the solder layer so that said probe can move to its second measured position.

15. The method of measuring solder thickness comprising the steps of:
moving a thickness measuring probe onto the top of a solder layer on an article;
recording the first position of the thickness measuring probe on the cold, unmelted solder layer;
heating the solder layer to a sufficient degree to melt the solder layer so that the probe can move to the bottom of the solder layer to a second position;
recording the second position of the probe;
subtracting the measurement of the first position from the measurement of the second position to determine the thickness of the solder layer; and measuring the position of the article at the time of the first measurement and at the time of the second measurement and employing the difference therebetween to calculate the thickness of the solder layer to eliminate changes in position of the article which would introduce solder thickness measuring errors.

16. The method of claim 15 including the step of permitting the solder layer to cool while the probe is in its second position before taking the second position measurement to reduce measurement errors due to thermal changes.

* * * * *